(12) United States Patent
Utkin (10) Patent No.: US 9,819,244 B2
(45) Date of Patent: Nov. 14, 2017

(54) ENERGY GENERATION METHOD AND APPARATUS

(71) Applicant: Valeriy Utkin, Livingston, NJ (US)

(72) Inventor: Valeriy Utkin, Livingston, NJ (US)

( * ) Notice: Subject to any disclaimer, the term of this patent is extended or adjusted under 35 U.S.C. 154(b) by 405 days.

(21) Appl. No.: 14/747,454

(22) Filed: Jun. 23, 2015

(65) Prior Publication Data
US 2016/0380507 A1     Dec. 29, 2016

(51) Int. Cl.
*H02K 7/02*     (2006.01)
*F03B 13/20*     (2006.01)

(52) U.S. Cl.
CPC ............... *H02K 7/02* (2013.01); *F03B 13/20* (2013.01); *F05B 2250/231* (2013.01); *F05B 2250/232* (2013.01); *F05B 2250/241* (2013.01); *Y02E 10/38* (2013.01)

(58) Field of Classification Search
CPC ..... H02K 7/02; F03B 13/20; F05B 2250/231; F05B 2250/232; F05B 2250/241; Y02E 10/38
USPC .......................................................... 310/74
See application file for complete search history.

(56) References Cited

U.S. PATENT DOCUMENTS

| | | |
|---|---|---|
| 1,016,022 A | 1/1912 | Lundquist |
| 1,068,283 A | 7/1912 | Starry |
| 1,035,993 A | 8/1912 | Moore |
| 1,074,292 A | 9/1913 | Reynolds |
| 1,263,865 A | 4/1918 | Dale |
| 3,928,967 A | 12/1975 | Salter |
| 7,629,704 B2 | 12/2009 | Hench |
| 8,525,360 B2 * | 9/2013 | Ono .................. F03B 13/20 290/42 |
| 2009/0160191 A1 * | 6/2009 | Beane .................. F03B 13/20 290/53 |
| 2011/0278848 A1 * | 11/2011 | Gimsa .................. F03B 13/1855 290/53 |

OTHER PUBLICATIONS

"Marine and Hydrokinetic Technology Database", http://en.openei.org/wiki/Marine_and_Hydrokinetic+Technology+Database, printed out Jun. 10, 2015.
"Automatic Watch", http://en.wikipedia.org/wiki/Automatic_watch, printed out Jun. 10, 2015.

(Continued)

*Primary Examiner* — Jianchun Qin
(74) *Attorney, Agent, or Firm* — Walter J. Tencza, Jr.

(57) ABSTRACT

A hollow first housing with a rigid wall and a center of mass located on a portion of the rigid wall to which a weight is attached. When force is applied to tilt the apparatus then the center of mass is raised. When force is discharged, then a rocking motion of the hollow sphere device or housing will seek an equilibrium at the minimum gravitational potential energy. The rocking motion of the first housing activates a circular motion of a pendulum object. Motion of the pendulum object is passed to an electrical generator, which in turn produces electricity. The first housing may be a round circular hollow sphere, a circular cylinder, a cone, a frustrum, or may be configured in other shapes. A sail may be attached to an external surface of the first housing, at a location on the first housing furthest away from and opposite the weight.

21 Claims, 6 Drawing Sheets

(56) References Cited

OTHER PUBLICATIONS

"Roly-poly toy", http://end.wikipedia.org/wiki/Roly-poly_toy, printed out Jun. 10, 2015.
"Kobalt 20 piece Double-Drive Ratchet Set with Bonus 50-piece Bit Set and Pouch #0172851", http://www.amazon.com/Kobalt-20piece-Double-Drive-50-piece/, printed out Jun. 10, 2015.
Roly Poly toys, http://www.amazon,com, printed out Jun. 10, 2015.
"Conical Pendulum", htt://en.wikipedia.org/wiki/Conical_pendulum, printed out Jun. 10, 2015.
"Rocking Power—Generating Electricity Using the Rocking Motion of Waves", May 7, 2015, http://janderson99.hubpages.com/hub/, printed out Jun. 10, 2015.

\* cited by examiner

ENERGY GENERATION METHOD AND APPARATUS

FIELD OF THE INVENTION

This invention relates to improved methods and apparatus concerning generating of electricity.

BACKGROUND OF THE INVENTION

There are various devices known in the art for generating electricity from the Potential energy sources.

SUMMARY OF THE INVENTION

In at least one embodiment, a hollow sphere device or housing is provided which has a rigid spherical wall. The center of mass of the hollow sphere is located on a portion of the rigid spherical wall to which a weight is attached. When force is applied to tilt the apparatus then center of mass is raised. When force is discharged, then a rocking motion of the hollow sphere device or housing will seek an equilibrium at the minimum gravitational potential energy. The rocking motion of the hollow sphere device activates a circular motion of a ball which is part of a conical pendulum. Motion of the pendulum is passed to an electrical generator, which in turn produces electricity.

In at least one embodiment, an apparatus is provided comprising a first housing having an inner chamber; a weight fixed to an inner wall of the inner chamber; a second housing fixed to the first housing; and a first device located inside an inner chamber of the second housing.

The first device may include a pendulum device having a rigid pendulum arm and a pendulum object; a shaft; and a electrical generator. The rigid pendulum arm of the first device may have a first end connected to the pendulum object of the first device and opposing second end. The second end of the rigid pendulum arm of the first device may be configured with respect to the shaft of the first device, so that orbital rotation of the pendulum object of the first device around the shaft of the first device causes the shaft of the first device to rotate. The electrical generator of the first device may generate electrical power in response to the rotation of the shaft of the first device.

The second end of the pendulum arm of the first device may be fixed to a third housing. The orbital rotation of the pendulum object of the first device around the shaft of the first device in either a clockwise or a counterclockwise direction may cause the third housing of the first device to rotate in a corresponding clockwise or counterclockwise direction. The orbital rotation of the pendulum object of the first device around the shaft of the first device either a clockwise or a counterclockwise direction may cause the shaft of the first device to rotate in a single direction, either clockwise or counterclockwise.

The first housing may be a round circular hollow sphere, a circular cylinder, a cone, a frustrum, or may be configured in other shapes.

The apparatus may further include a sail attached to an external surface of the first housing, at a location on the first housing furthest away from and opposite the weight.

The apparatus may include a swivel device connected to an outside surface of the first housing, at a location which is substantially central with respect to the weight; wherein the weight and the swivel device are connected to the first housing so that the weight lies between a majority of the inner chamber of the first housing and the swivel device; and wherein the swivel device is connected to the first housing in a manner which allows the first housing to rotate in a horizontal and in a vertical plane with respect to the swivel device.

In at least one embodiment, the apparatus may further include a third housing fixed to the first housing; and a second device located inside an inner chamber of the third housing. The second device may include a pendulum device having a rigid pendulum arm and a pendulum object; a shaft; and an electrical generator. The rigid pendulum arm of the second device may have a first end connected to the pendulum object of the second device and an opposing second end. The second end of the rigid pendulum arm of the second device may be configured with respect to the shaft of the second device, so that orbital rotation of the pendulum object of the second device around the shaft of the second device causes the shaft of the second device to rotate. The electrical generator of the second device may generate electrical power in response to the rotation of the shaft of the second device.

In at least one embodiment, another housing or additional housing, which may be identical or similar to the first housing may be provided, such as another sphere. This additional housing identical or similar to the first housing may also have an inner chamber; a weight fixed to an inner wall of the inner chamber of this additional housing; an inner housing fixed to the additional housing; and a second device located inside an inner chamber of the inner housing of the additional housing. The second device may include a pendulum device having a rigid pendulum arm and a pendulum object; a shaft; and a electrical generator. The rigid pendulum arm of the second device may have a first end connected to the pendulum object of the second device and opposing second end. The second end of the rigid pendulum arm of the second device is configured with respect to the shaft of the second device, so that orbital rotation of the pendulum object of the second device around the shaft of the second device causes the shaft of the second device to rotate; and wherein the electrical generator of the second device generates electrical power in response to the rotation of the shaft of the second device.

The first housing and the identical or similar additional housing may be mechanically connected together by one or more swivel devices which allow the first housing to rotate with respect to the additional housing in a horizontal and a vertical plane.

In at least one embodiment, a method is provided which comprises placing an apparatus in water, and generating electrical power from the apparatus, wherein the apparatus may be as previously described. Alternatively, in accordance with another method, the apparatus may be placed on the ground and electrical power may be generated from the apparatus.

DETAILED DESCRIPTION OF THE DRAWINGS

Figure 1:
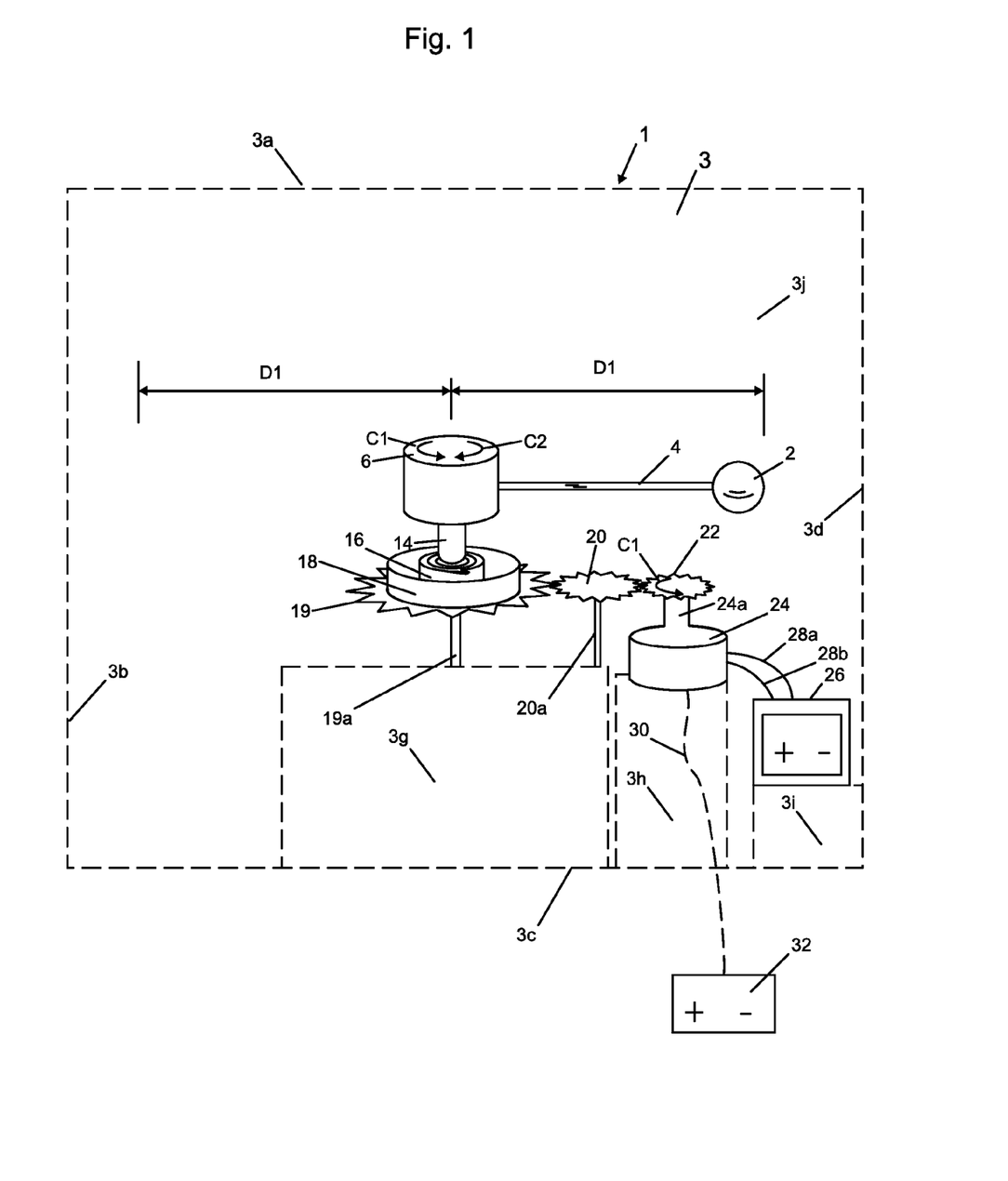
FIG. 1 shows various components in a housing and an onshore energy storage or onshore energy grid, all of which can be used in accordance with one or more embodiments of the present invention

FIG. 1 shows an apparatus, method, and system 1 in accordance with one or more embodiments of the present invention.

The apparatus, method and system 1 includes a pendulum ball 2, a housing 3, a pendulum rod 4, a gear box or housing 6, a shaft 14, a spring device 16, a barrel 18, a gear 19, a gear 20, a gear 22, an electrical generator 24, battery 26, electrical wires or conductors 28a-b, shore electrical cable or wireless connection 30, and onshore energy storage or onshore energy grid 32. If the component 30 is an electrical cable 30, the electrical cable 30 will have a protective coating to protect inside electrical conductor or conductors from damage from water for example, and to make the electrical cable 30 save for the environment. The energy storage 32 may be a battery, in at least one embodiment. The combination of the spring device 16, barrel 18, and gear 19 may be a spring barrel, as known, such as used as a mechanism to wind a clock.

The pendulum ball 2 is shown as a round sphere ball but may be of other shapes.

Figure 2:
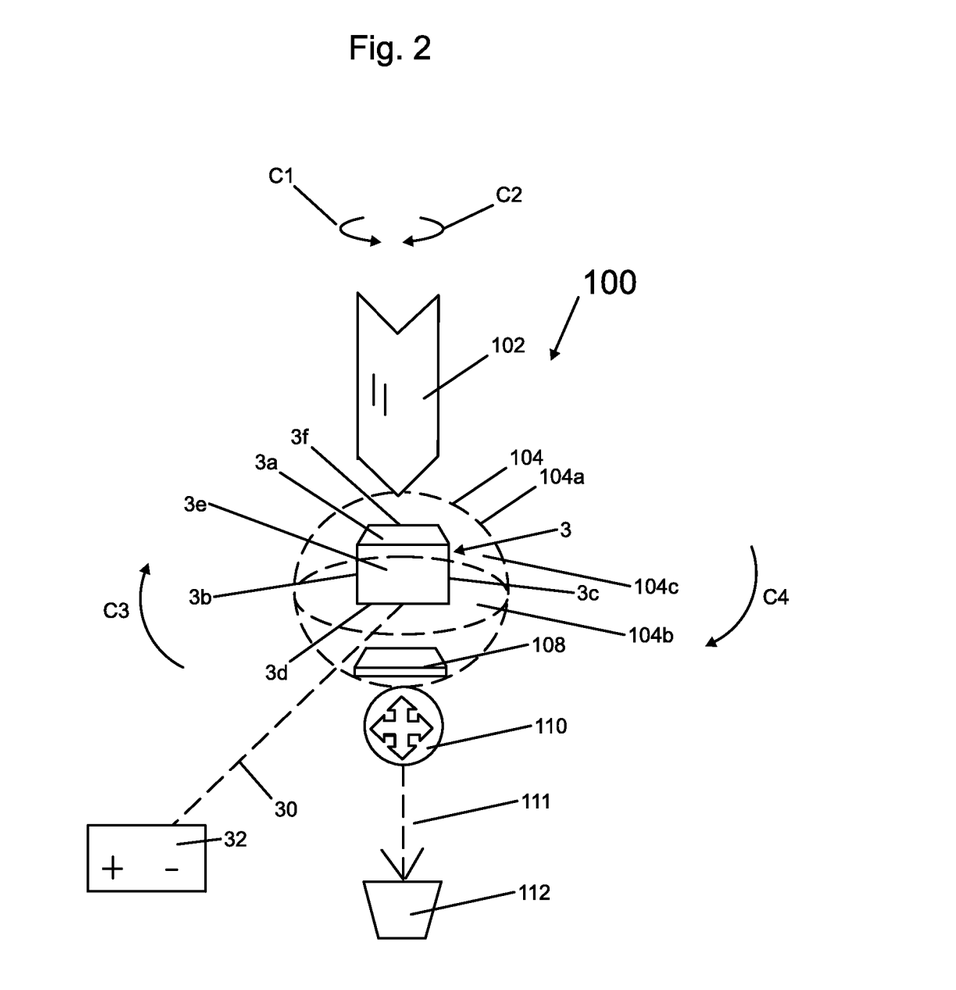
FIG. 2 shows the housing of FIG. 1 located in a sphere and various other components of an apparatus, method, and system in accordance with one or more embodiments of the present invention.

The housing 3 includes top side 3a, left side 3b, right side 3d, bottom side 3c, front side 3e (shown in FIG. 2), and rear side 3f (location shown in FIG. 2). The housing 3 also has shelves or sections 3g, 3h, and 3i, and inner chamber 3j. The housing 3 may be a six sided cube having an open inner chamber area 3j, and inner mounting shelves or sections 3g, 3h, and 3i.

The barrel 18 and gear 19 may be rotatably mounted to post 19a which may be mounted shelf or section 3g. The gear 20 may be rotatably mounted to post 20a which may be mounted to shelf 3g. The gear 22 may be rotatably mounted to generator post section 24a. The generator 24 may be fixed to shelf or section 3h. The battery 26 may be fixed to shelf or section 3i. The shelves or sections 3g, 3h, and 3i may be fixed to one or more of sides 3a-3f so that shelves 3g, 3h, and 3i do not move with respect to sides 3a-3f.

The pendulum rod 4 which may be made of a hard rigid material, is typically fixed at a first end to the housing 6 and at a second opposing end to the pendulum ball 2. When the pendulum ball 2 moves in an orbit around the shaft 14, the housing 6 turns. The ball 2 may move in a counterclockwise direction C1 or in a clockwise orbital direction C2 around the housing 6 which also causes the housing 6 to rotate correspondingly in a counterclockwise direction C1 or in a clockwise orbital direction C2. I.e. if the ball 2 orbits around the housing 6 in a counterclockwise direction C1, the housing 6 will rotate in a counterclockwise direction C1; and if the ball 2 orbits around the housing 6 in a clockwise direction C2, the housing 6 will rotate in a clockwise direction C2.

However, the turning of the housing 6, in either the counterclockwise direction C1 or the clockwise direction C2, will cause the generator gear 22 to turn in a single direction, such as counterclockwise C1. The rotation of the generator gear 22 in the single direction, such as counterclockwise C1, causes the generator 24 to generate electricity which is supplied to power or charge battery 26 through conductors or wires 28a and 28b. The generator 24 may also supply power through a wireless connection or electrical cable 30 to an onshore energy storage or onshore energy grid 32.

The apparatus, system, and/or method 1 uses the counterclockwise rotation C1 or the clockwise rotation C2 of the pendulum ball 2 to cause rotation of the generator gear 22 by use of housing 6, shaft 14, spring device 16, barrel 18, gear 19, and gear 20, however various known devices can be used to change the rotation in two directions (counterclockwise and clockwise) to rotation in one direction, such as clockwise. For example, a double drive ratchet handle tool is known which has a handle which when turned either clockwise or counterclockwise, will cause a device to move in one direction such as clockwise.

In at least one embodiment of the present invention, the orbital rotation of the pendulum ball 2, causes the rod 4 to turn the housing 6. In at least one embodiment, the turning of the housing 6 in either a counterclockwise C1 or clockwise C2 direction causes the shaft 14 to turn in a single direction, such as counterclockwise C1. The housing 6 may include one or more gears in a mechanism as known in the art, which can cause the shaft 14 to move in a single rotational direction, such as counterclockwise C1, in response to movement of the pendulum ball 2 in either the counterclockwise C1 or clockwise direction C2. Thus the shaft 14 always turns in the counterclockwise direction regardless of whether the ball 2 moves in a counterclockwise direction or a clockwise direction around shaft 14.

The turning of the shaft 14 in a counterclockwise direction C1, winds a spiral spring 16 called the mainspring, which provides power to run the generator 24. The barrel 18 turns on a post 19a. The spring 16 is hooked to the barrel 18 at its outer end and to the shaft 14 at its inner end. The geer 19 teeth engage gear 20 and so on until the generator 24. The combination of the spring 16, barrel 18 and gear 19 may be a known barrel device of a form used in clocks and watches. The combination of the spring 16, barrel 18 and gear 19 is wound by turning the shaft 14 and drives the generator 24 by engaging gears 19, 20 and 22. This enables the mainspring 16 to continue running the generator 24 while it is being wound. The known barrel device, such as including spring 16, barrel 18 and gear 19 may be of the type innvented and/or developed by Jean-Antoine Lépine.The gear 19 then turns the gear 20 which will then turn the gear 22, which will cause the generator 24 to generate power. Gear 19 turning counter clockwise C1 turns the gear 20 clockwise which turns the gear 22 counterclockwise.

As shown in FIG. 1, the distance D1 is the distance between the center of the housing 6 and the outside surface of the ball 2. The housing 3 is configured to be large enough in at least one embodiment, to allow the ball 2 to rotate three hundred and sixty degrees in an orbit around the center of the shaft 14. Thus, if the housing 3 is a cube as in FIG. 1, the length of the side of the cube should be greater than twice the distance D1 to allow complete rotation of the ball 2 around the shaft 14.

The walls or sides 3a-3f should be rigid walls to sustain the components should in FIG. 1 inside of the housing 3. The shelves or sections 3g, 3h, and 3i should also be rigid.

FIG. 2 shows another apparatus, method, and system 100 in accordance with one or more embodiments of the present invention.

The apparatus, method, and system 100 includes sail device 102, circular sphere 104, the housing 3 of FIG. 1, and all of the components in the housing 3 of FIG. 1, a balance weight 108, a swivel 110, a chain 111, and anchor 112.

The housing 3 is fixed to a shelf or section 104b inside an inner chamber 104c of the circular sphere 104. The section or shelf 104 is fixed to a peripheral wall 104a of the sphere 104. The housing 3, and all of the components shown in the housing 3 in FIG. 1, are located inside the inner chamber 104c. The balance weight 108 is fixed to the peripheral wall 104a of the sphere 104.

In operation, when the sphere 104 rotates back and forth in the counterclockwise C1 or the clockwise C2 directions in a horizontal plane, or is tilted in the C3 and C4 directions a vertical plane, the pendulum ball 2 will orbitally rotate in response in either the counterclockwise C1 or clockwise C2 directions. This will cause the generator gear 22 to rotate in a single direction, such as counterclockwise C1, which will cause the generator 24 to generate power and supply it to either the battery 26 or the battery onshore energy storage or onshore grid 32. The balance weight 108 is used to bias the sphere 4 back to a steady state or rest position shown in FIG. 2.

The apparatus 100 can be placed in water and wave motion of the water can be used to cause the rotation of the sphere 104 in the counterclockwise C1 or clockwise C2 directions in a horizontal plane, or tilting of the sphere 104 in the C3 and C4 directions in a vertical plane. The sale 102 using wind can also cause rotation of the sphere 104 in the counterclockwise C1 or clockwise C2 directions in a horizontal plane or tilting of the sphere 104 in the C3 and C4 directions in a vertical plane, even if there is no wave motion, or even if the sphere 104 is placed on land. The swivel device 110 is attached to the peripheral wall 104a so that the sphere 104 can rotate in the counterclockwise C1 or clockwise C2 directions with respect to the swivel device 110 and in at least one embodiment, be tilted with respect to the swivel device 110. This also allows the sphere 104 to rotate in the counterclockwise C1 or clockwise C2 directions with respect to the chain 111 and the anchor 112. The anchor 112 may be located on a land bottom of a lake, ocean, or other water body.

The sphere 104 and the peripheral wall 104a may be configured to float in water and may be made of an appropriate material which floats. The sphere 104 may be completely sealed so that water does not get to the components in the inner chamber 104c.

In at least one embodiment the sphere 104 may be partially or fully submerged in liquid. The sphere 104 may be positioned on a platform, on a solid ground surface, or inside of a frame. The weight of the sphere 104 and the balancing weight 108 and the other components in housing 3, should be positioned and balanced to achieve the greatest amplitude and maximum trajectory during oscillation of the sphere 104 and housing 3.

Figure 3:
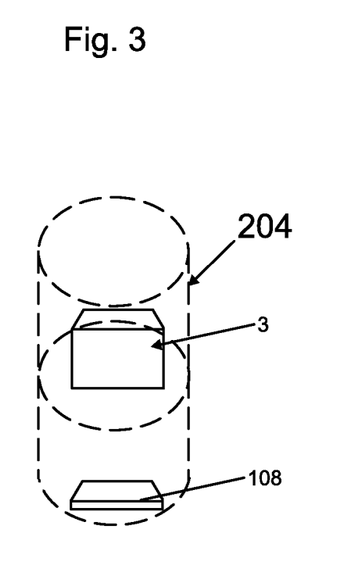
FIG. 3 shows a top, front perspective view of a cylinder for use in one or more embodiments of the present invention.

FIG. 3 shows a top, front perspective view of a circular cylinder 204 which can be used in the apparatus 100 of FIG. 2, in place of the sphere 104.

Figure 4:
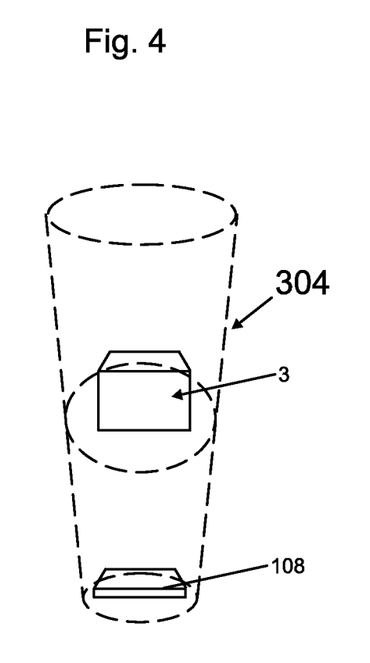
FIG. 4 shows a top front perspective view of cone or frustum for use in one or more embodiments of the present invention.

FIG. 4 shows a top, front perspective view of a cone or frustum, such as a right circular cone or frustum 304 which can be used in the apparatus, method, and system 100 instead of the circular sphere 104.

Figure 5:
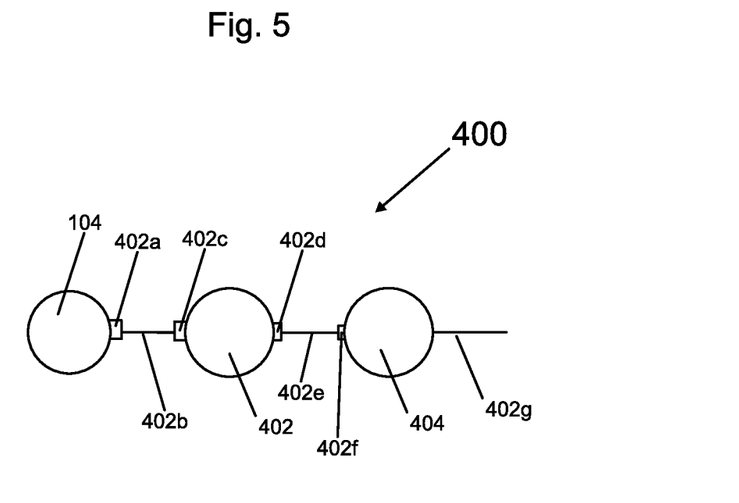
FIG. 5 shows a top view a plurality of spheres connected together mechanically and electrically in accordance with another embodiment of the present invention.

FIG. 5 shows a top simplified view of a diagram 400 of a plurality of spheres, each of which may be identical or substantially the same as sphere 104 of FIG. 2. FIG. 5 shows the spheres 104, 402, and 404. The sphere 104 is connected mechanically and electrically to the sphere 402 by swivel device 402a, conductor 402b, and swivel device 402c. The sphere 402 is connected mechanically and electrically to the sphere 404 by the swivel device 402d, conductor 402e, and swivel device 402f. The total electrical output of the spheres 104, 402, and 404 may be provided as a combined output on line 402g which may be connected to an onshore battery, a battery located in any one of the spheres 104, 402 or 404.

Each of the spheres 104, 402, and 404 may include or have attached thereto all of the components shown in FIGS. 1 and 2.

Figure 6:
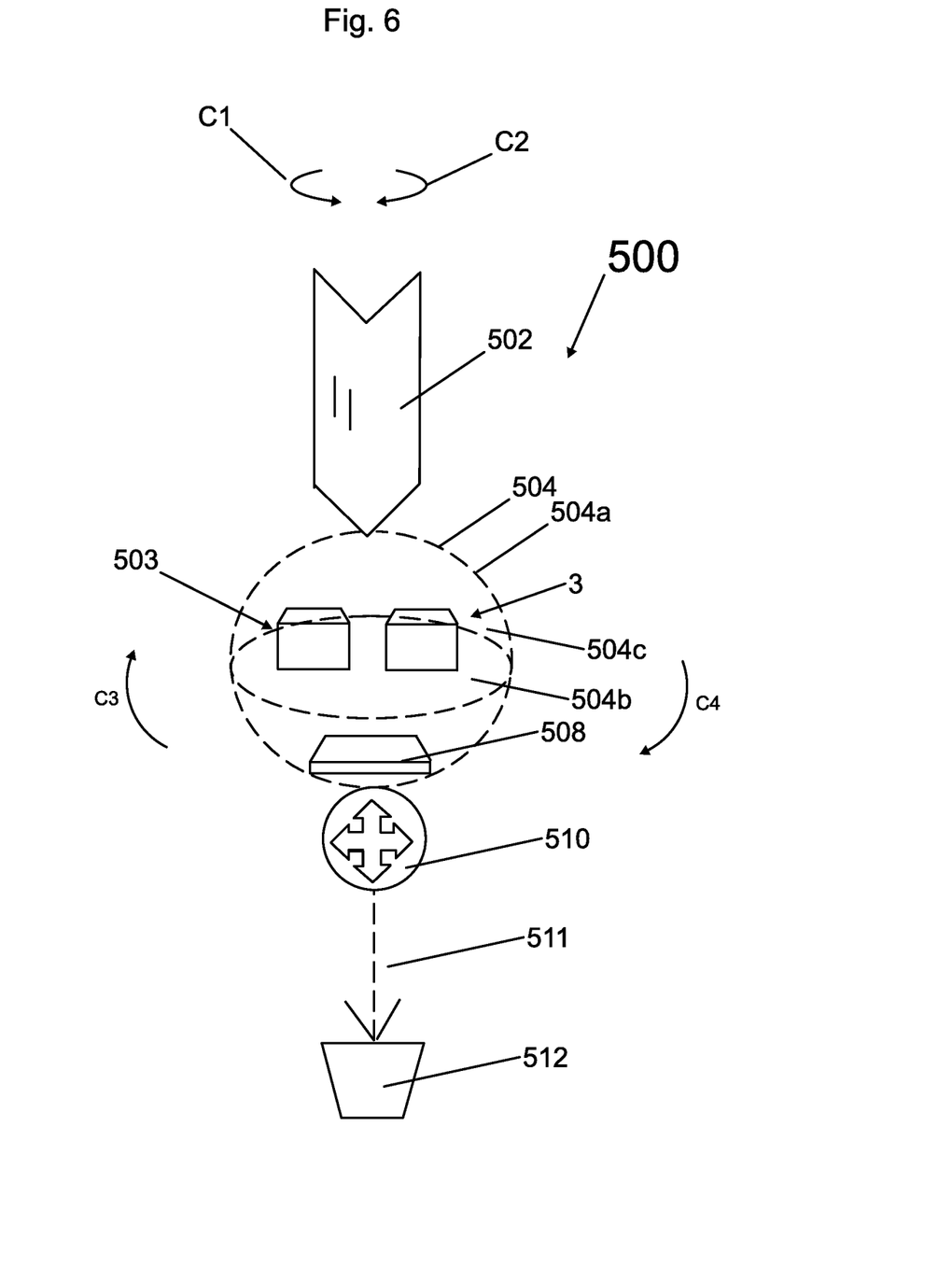
FIG. 6 shows two housings, both identical to the housing shown in FIG. 1, inside of a sphere in accordance with another embodiment of the present invention.

FIG. 6 shows a housings 3 and 503, both identical to the housing 3 shown in FIG. 1, inside of a sphere 504 in accordance with another embodiment of the present invention. FIG. 6 shows an apparatus 500 which may be identical to apparatus 100 of FIG. 2, except that two housings 3 and 503 are shown in FIG. 6. Any number of housings, identical to housing 3 can be placed in a sphere similar or identical to sphere 104 or 504 to provide more sources of electricity generation. The apparatus 500 includes sail 502, weight 508, swivel device 510, chain 511, and anchor 512, similar or identical to sail 102, weight 108, swivel device 110, chain 111, and anchor 112.

The swivel device 110 may be configured to allow the sphere 104 to rotate counterclockwise C1 or clockwise C2 in a horizontal plane and to swivel in the directions C3 and and C4 in a vertical plane as shown in FIG. 2. The weight 108 causes the sphere 104 to return to the steady state or equilibrium position shown in FIG. 2, with the weight 108 shown at the bottom. The sphere 104 may be rocked or disturbed from its equilibrium state of FIG. 2, by a force, such as in the directions C3 and C4; and after such a force is removed, the sphere 104 will rock back and forth until it again settles down in its rest, equilibrium position shown in FIG. 2.

Figure 7:
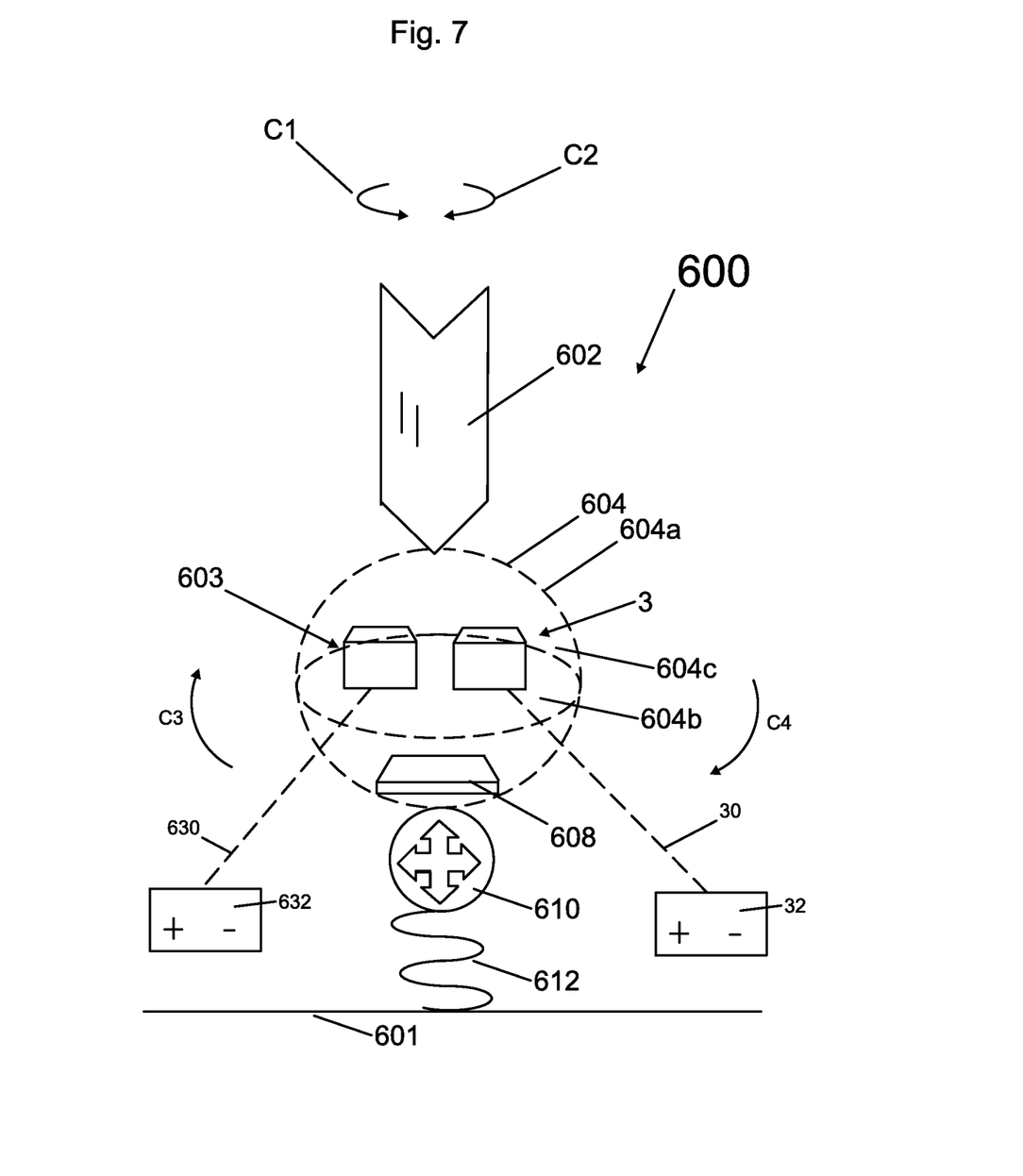
FIG. 7 shows two housing both identical to the housing shown in FIG. 1, inside of a sphere attached to a swivel device which is attached to a coil spring, flexible rod or pipe in accordance with another embodiment of the present invention.

FIG. 7 shows an apparatus 600 including two housings 3 and 603 both identical to the housing 3 shown in FIG. 1, inside of a sphere 604 attached to a swivel device 610 which is attached to a coil spring, flexible rod or pipe 612 in accordance with another embodiment of the present invention. The spring, rod or pipe 612 helps to keep sphere 604 in the upright, steady state, or equilibrium position shown in FIG. 7, when the spring, rod, or pipe 612 is on a ground surface 601. FIG. 7 also shows cables or wireless connections 30 and 630 connected to onshore energy storages or grids 32 and 632.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a first housing having an inner chamber;
   a weight fixed to an inner wall of the inner chamber;
   a second housing fixed to the first housing;
   a first device located inside an inner chamber of the second housing;
   wherein the first device includes:
   a pendulum device having a rigid pendulum arm and a pendulum object;
   a shaft; and an electrical generator;
wherein the rigid pendulum arm of the first device has a first end connected to the pendulum object of the first device and opposing second end;
wherein the second end of the rigid pendulum arm of the first device is configured with respect to the shaft of the first device, so that orbital rotation of the pendulum object of the first device around the shaft of the first device causes the shaft of the first device to rotate;
wherein the electrical generator of the first device generates electrical power in response to the rotation of the shaft of the first device.

2. The apparatus of claim 1 wherein
the second end of the pendulum arm of the first device is fixed to a third housing;
and wherein orbital rotation of the pendulum object of the first device around the shaft of the first device in either a clockwise or a counterclockwise direction causes the third housing of the first device to rotate in a corresponding clockwise or counterclockwise direction; and
wherein orbital rotation of the pendulum object of the first device around the shaft of the first device either a clockwise or a counterclockwise direction causes the shaft of the first device to rotate in a single direction, either clockwise or counterclockwise.

3. The apparatus of claim 1 wherein
the first housing is in a round circular hollow sphere.

4. The apparatus of claim 1 wherein
the first housing is a circular cylinder.

5. The apparatus of claim 1 wherein
the first housing is a cone.

6. The apparatus of claim 1 wherein
the first housing is a frustum.

7. The apparatus of claim 1 further comprising
a sail attached to an external surface of the first housing, at a location on the first housing furthest away from and opposite the weight.

8. The apparatus of claim 1 further comprising
a swivel device connected to an outside surface of the first housing, at a location which is substantially central with respect to the weight;
and wherein the weight and the swivel device are connected to the first housing so that the weight lies between a majority of the inner chamber of the first housing and the swivel device; and wherein the swivel device is connected to the first housing in a manner which allows the first housing to rotate in a horizontal and in a vertical plane with respect to the swivel device.

9. The apparatus of claim 1 further comprising
a third housing fixed to the first housing;
a second device located inside an inner chamber of the third housing;
wherein the second device includes
a pendulum device having a rigid pendulum arm and a pendulum object;
a shaft; and
an electrical generator;
wherein the rigid pendulum arm of the second device has a first end connected to the pendulum object of the second device and an opposing second end;
wherein the second end of the rigid pendulum arm of the second device is configured with respect to the shaft of the second device, so that orbital rotation of the pendulum object of the second device around the shaft of the second device causes the shaft of the second device to rotate;
wherein the electrical generator of the second device generates electrical power in response to the rotation of the shaft of the second device.

10. The apparatus of claim 1 further comprising
a third housing having an inner chamber;
a weight fixed to an inner wall of the inner chamber of the third housing;
a fourth housing fixed to the third housing;
a second device located inside an inner chamber of the fourth housing;
wherein the second device includes:
a pendulum device having a rigid pendulum arm and a pendulum object;
a shaft; and
an electrical generator;
wherein the rigid pendulum arm of the second device has a first end connected to the pendulum object of the second device and opposing second end;
wherein the second end of the rigid pendulum arm of the second device is configured with respect to the shaft of the second device, so that orbital rotation of the pendulum object of the second device around the shaft of the second device causes the shaft of the second device to rotate;
wherein the electrical generator of the second device generates electrical power in response to the rotation of the shaft of the second device;
and wherein the first housing and the third housing are mechanically connected together by one or more swivel devices which allow the first housing to rotate with respect to the third housing in a horizontal and a vertical plane.

11. A method comprising
placing an apparatus in water, and
generating electrical power from the apparatus;
wherein the apparatus comprises
a first housing having an inner chamber;
a weight fixed to an inner wall of the inner chamber;
a second housing fixed to the first housing;
a first device located inside an inner chamber of the second housing;
wherein the first device includes:
a pendulum device having a rigid pendulum arm and a pendulum object;
a shaft; and
an electrical generator;
wherein the rigid pendulum arm of the first device has a first end connected to the pendulum object of the first device and opposing second end;
wherein the second end of the rigid pendulum arm of the first device is configured with respect to the shaft of the first device, so that orbital rotation of the pendulum object of the first device around the shaft of the first device causes the shaft of the first device to rotate;
wherein the electrical generator of the first device generates electrical power in response to the rotation of the shaft of the first device.

12. The method of claim 11 wherein
the second end of the pendulum arm of the first device is fixed to a third housing;
and wherein orbital rotation of the pendulum object of the first device around the shaft of the first device in either a clockwise or a counterclockwise direction causes the third housing of the first device to rotate in a corresponding clockwise or counterclockwise direction; and
wherein orbital rotation of the pendulum object of the first device around the shaft of the first device either a clockwise or a counterclockwise direction causes the shaft of the first device to rotate in a single direction, either clockwise or counterclockwise.

13. The method of claim 11 wherein
the first housing is in a round circular hollow sphere.

14. The method of claim 11 wherein
the first housing is a circular cylinder.

15. The method of claim 11 wherein
the first housing is a cone.

16. The method of claim 11 wherein
the first housing is a frustum.

17. The method of claim 11 further comprising
a sail attached to an external surface of the first housing, at a location on the first housing furthest away from and opposite the weight.

18. The method of claim 11 further comprising
a swivel device connected to an outside surface of the first housing, at a location which is substantially central with respect to the weight;
and wherein the weight and the swivel device are connected to the first housing so that the weight lies between a majority of the inner chamber of the first housing and the swivel device; and wherein the swivel device is connected to the first housing in a manner which allows the first housing to rotate in a horizontal and in a vertical plane with respect to the swivel device.

19. The method of claim 11 further comprising
a third housing fixed to the first housing;
a second device located inside an inner chamber of the third housing;
wherein the second device includes
a pendulum device having a rigid pendulum arm and a pendulum object;
a shaft; and
an electrical generator;
wherein the rigid pendulum arm of the second device has a first end connected to the pendulum object of the second device and an opposing second end;
wherein the second end of the rigid pendulum arm of the second device is configured with respect to the shaft of the second device, so that orbital rotation of the pendulum object of the second device around the shaft of the second device causes the shaft of the second device to rotate;
wherein the electrical generator of the second device generates electrical power in response to the rotation of the shaft of the second device.

20. The method of claim 11 further comprising
a third housing having an inner chamber;
a weight fixed to an inner wall of the inner chamber of the third housing;
a fourth housing fixed to the third housing;
a second device located inside an inner chamber of the fourth housing;
wherein the second device includes:
a pendulum device having a rigid pendulum arm and a pendulum object;
a shaft; and
an electrical generator;
wherein the rigid pendulum arm of the second device has a first end connected to the pendulum object of the second device and opposing second end;
wherein the second end of the rigid pendulum arm of the second device is configured with respect to the shaft of the second device, so that orbital rotation of the pendulum object of the second device around the shaft of the second device causes the shaft of the second device to rotate;
wherein the electrical generator of the second device generates electrical power in response to the rotation of the shaft of the second device;
and wherein the first housing and the third housing are mechanically connected together by one or more swivel devices which allow the first housing to rotate with respect to the third housing in a horizontal and a vertical plane.

21. A method comprising
placing an apparatus on the ground, and
generating electrical power from the apparatus;
wherein the apparatus comprises
a first housing having an inner chamber;
a weight fixed to an inner wall of the inner chamber;
a second housing fixed to the first housing;
a first device located inside an inner chamber of the second housing;
wherein the first device includes:
a pendulum device having a rigid pendulum arm and a pendulum object;
a shaft; and
an electrical generator;
wherein the rigid pendulum arm of the first device has a first end connected to the pendulum object of the first device and opposing second end;
wherein the second end of the rigid pendulum arm of the first device is configured with respect to the shaft of the first device, so that orbital rotation of the pendulum object of the first device around the shaft of the first device causes the shaft of the first device to rotate;
wherein the electrical generator of the first device generates electrical power in response to the rotation of the shaft of the first device.

* * * * *